United States Patent Office 3,644,333
Patented Feb. 22, 1972

3,644,333
TRANSESTERIFICATION IN THE PRESENCE OF A TRANSPARENT EMULSION
Lloyd I. Osipow, New York, and William Rosenblatt, Spring Valley, N.Y., assignors to the State of Nebraska, Lincoln, Nebr.
No Drawing. Filed Jan. 28, 1969; Ser. No. 794,793
Int. Cl. C07c 69/32
U.S. Cl. 260—234 R        5 Claim

ABSTRACT OF THE DISCLOSURE

An improved process for synthesizing organic compounds is provided in which a reaction is conducted between immiscible reactants, the process comprises combining the immiscible reactants in the presence of water and suitable emulsifying agents to form a transparent emulsion, and carrying out a reaction between said immiscible reactants to form a reaction product. The improvement also provides a process in which water is distilled from the transparent emulsion to form a microdisperison, and a reaction is carried out between two immiscible reactants, one of which is in the form of very fine solid particles dispersed in a liquid medium. Furthermore, an improved process of preparing sucrose esters is provided which comprises employing water as the solvent for the sucrose component in a transparent emulsion, distilling off the water to form a microdispersion of sucrose, and reacting the solid sucrose particles to form sucrose esters of fatty acids.

---

Generally stated, the subject matter of the present invention relates to an improved process for synthesizing organic compounds where the reactants are insoluble or only slightly soluble in each other, that is, immiscible reactants. More particularly, the invention relates to an improved process of synthesizing organic compounds employing a transparent emulsion system.

BACKGROUND OF THE INVENTION

The advent of the transparent emulsion system which is the subject our earlier U.S. Pat. No. 3,480,616, patented Nov. 25, 1969, has substantially overcome many of the inherent disadvantages occasioned by immiscible reactants. The most notable disadvantage was the severe limitation imposed by the limited number of suitable mutual solvents available for such reactants, and while many disadvantages have been overcome, such reaction system often requires an anhydrous medium.

The utilization of an aqueous medium in a transparent emulsion system has advantages which become readily apparent when one considers the relative solubility of particular water-soluble reactants in organic solvents, as well as the ultimate end use of the reaction product.

In the first instance, the relative solubility of a water-soluble reactant will often require the utilization of a larger quantity of an organic solvent as contrasted to water. Therefore, the reaction will entail the use of larger reaction kettles. Secondly, the nature of the ultimate end use of the reaction product, such as its utilization as a food additive, limits the choice of solvents, or necessitates essentially the complete removal of the solvent from the reaction products.

Additional advantages realized by the use of an aqueous medium relate to the nature and stability of the reaction products. Consider that in the preparation or recovery of a reaction product the particular organic solvent employed must often be distilled off. Therefore, in those instances in which the reaction product is heat labile, the higher temperatures that may be required to distill off an organic solvent can result in the degradation of the reaction product.

The present invention represents the culmination of a long series of investigations, conducted largely by the inventors, directed to improving the transparent emulsion system.

Accordingly, it is a primary object of the present invention to provide an improved transparent emulsion system for synthesizing organic compounds.

It is a further object of this invention to provide a process in which the quantity of the reaction mass of the transparent emulsion system is reduced when a water-soluble reactant is employed.

Yet another object of this invention is to provide a process in which the solvent may be readily removed from the reaction product.

Generally then, it is an object of this invention to provide a process for synthesizing organic compounds employing a transparent emulsion system in which water rather than an organic solvent is used to dissolve a water-soluble immiscible reactant.

Additional objects and advantages of the invention will be set forth in part in the description which follows, and in part will be obvious from the description, or may be realized by practice of the invention, the objects and advantages being realized and attained by means of the methods, processes, instrumentalities and combinations particularly pointed out in the appended claims.

THE INVENTION

To achieve the foregoing objects and in accordance with its purpose, as embodied and broadly described, the present invention relates to an organic synthesis process which is conducted between immiscible reactants which comprises combining the immiscible reactants in the presence of water and suitable emulsifying agents to form a transparent emnulsion, and carrying out the reaction between said immiscible reactants to form a reaction product.

The present invention further provides an improved process for preparing sucrose esters.

The invention consists of the novel methods, processes, steps and improvements shown and described.

It is to be understood that both the foregoing general descriptions and the following detailed descriptions are exemplary and explanatory and are not restrictive of the invention.

Therefore, the present invention provides an improved process for synthesizing organic compounds in which a transparent emulsion system is utilized. The advent of the present invention substantially improves the transparent emulsion system for organic synthesis, as well as materially reducing production costs by simplifying the process and enabling the use of water as a solvent for a water-soluble reactant.

Additionally, the present invention also provides for an improved process of synthesizing sucrose esters.

The invention finds a particular utility in those reactions where one of the reactants is an inorganic electrolyte, soluble in water and not appreciably soluble in an organic solvent, and the second reactant is an organic compound that is not especially soluble in water.

Broadly stated, the manner of carrying out the present invention is as follows:

The reactants are combined in the presence of water and a suitable emulsifying system to form a transparent emulsion. If water does not interfere with the reaction, the reaction is then carried out in the same manner as would be employed if the reactants were miscible, or if they were dissolved in a mutual solvent. If water does interfere, the water is distilled off and the reaction is then carried out in the usual manner. Thus, a catalyst may be added and heat supplied to speed the reaction.

Reaction rates are of the same general order in transparent emulsions or in microdispersions as in homogeneous solution reactions. In contrast, the same reactions involving immiscible reactants that are conducted in conventional opaque emulsions are generally far too slow to be practical.

The difference in reaction rates between transparent and opaque emulsions is due to the size of the dispersed droplets. Consider that the diameter of the dispersed droplets in a conventional opaque emulsion is usually in the order of several microns, or stated in another fashion, in the order of 100 times larger than the droplets in transparent emulsions where the droplets are under 0.05 micron in diameter. A reaction between reactants located entirely in different phases of an emulsion can only occur at the interface formed by the droplets and the continuous phase. Therefore, the fact that only a very small proportion of the reactant molecules of the dispersed phase is present at the interface in a conventional opaque emulsion, as contrasted with a transparent emulsion, indicates that there is likely to be an appreciable difference in reaction rates.

It should be noted at this point that while a transparent emulsion containing large droplets of the dispersed phase may be prepared by employing immiscible liquids that have the same refractive index, the use of such emulsions is not contemplated in the practice of this invention. This is so since an essential requirement of the present invention is the small size of the emulsified droplets.

The temperature at which an emulsion is transparent is reliant on a variety of factors, such as, the particular emulsifying agents employed, as well as the reactants themselves, to name but a few.

The emulsion system employed in the present invention may be characterized as either a transparent emulsion or a microemulsion. Both terms refer to emulsions with droplet diameters less than one-quarter of the wave-length of light. The emulsion systems may also be referred to as solubilized systems. According to this concept, the emulsifying agent which is used to form the transparent emulsion or solubilized system is present in the form of submicroscopic clusters called micelles, and the internal phase is dissolved or solubilized within the micelles. However, a ready mode of distinguishing between a microemulsion or one in which the internal phase is solubilized within micelles is presently unavailable.

The following publications discuss the theory and conditions under which transparent emulsions form: J. H. Shulman and J. B. Montagne, Ann. N. Y. Acad. Sci., 92 (Art. 2), 366 (1961); J. E. Bowcott and J. H. Shulman, Z. Elektrochem. 59, 283 (1955); J. H. Shulman, W. Stoeckenius, and L. M. Prince, J. Phys. Chem. 63, 1677 (1959); L. I. Osipow, J. Soc. Cosmetic Chemists, XIV, 277 (1963).

Instead of forming a transparent emulsion directly with the reactants, the reactants may be dissolved in separate solvents to obtain two immiscible solutions which are then emulsified to form a transparent emulsion.

Thus, it should be readily apparent from the foregoing that an essential feature of the invention is the formation of a transparent emulsion. In some instances it is also necessary to distill off the solvent that has been added to dissolve one of the reactants, and in so doing, form a microdispersion of that reactant in the remainder of the reaction mixture.

As stated above, the theoretical conditions for the formation of transparent emulsions are known. In general, from 10 to 40 percent of emulsifying agents are required for the formation of a transparent emulsion. Any of a large variety of emulsifying systems can be used to form transparent emulsions. The emulsifying agents that may be used in these systems include the non-ionic, anionic and cationic emulsifying agents.

An additional embodiment of the invention resides in the discovery of an improved process for preparing sucrose esters. Broadly stated, the manner of carrying out this additional embodiment of the invention is as follows:

The reaction between sucrose and the ester of a 12 to 22 carbon atom fatty acid occurs between the ester and solid sucrose having a very fine particle size, that is, in the magnitude of less than one micron in diameter, in the presence of an alkaline catalyst.

In essence, the ester is combined with sucrose, sufficient water to dissolve the sucrose, and an emulsifying agent or combination of emulsifying agents. A transparent emulsion is formed and the water is distilled off forming a dispersion comprising finely divided solid sucrose, the ester and the emulsifying agent. After essentially all of the water has been removed, an alkaline catalyst is added and the reaction mass is agitated at an elevated temperature.

In those instances in which the fatty acid ester employed is an ester of a volatile alcohol, such as, methanol and ethanol, the reaction mass is maintained under a vacuum subsequent to the removal of the water. The purpose of the vacuum is to distill off the volatile alcohol reaction product and thus drive the reaction to completion. Under these conditions all of the fatty acid ester of the volatile alcohol is converted to sucrose esters of the fatty acid.

Conversely, in those instances in which the fatty acid ester employed is an ester of a non-volatile alcohol, such those in tallow and vegetable oil, the utilization of a vacuum subsequent to the removal of water is unnecessary since such materials, as for example, glycerin, are not removed to any great extent by distillation. The application of heat subsequent to the addition of the alkaline catalyst increases the rate of equilibration between sucrose and tallow, for example, to form an end product which comprises a complex mixture of glyceryl mono-, di- and tri-esters, and sucrose mono-, di- and higher esters of the tallow fatty acids.

A preferred practice of the invention resides in employing emulsifying agents which are substantially the same as the products of the reaction. Therefore, sucrose stearate would be employed as the emulsifier in a sucrose, methyl stearate reaction. A further illustration of this point would be the utilization of a blend of sucrose and glyceryl esters of stearic acid as the emulsifier in a sucrose, glyceryl tri-stearate reaction. This practice takes on particular significance when viewed in a commercial production environment, since at the completion of the reaction a portion of the reaction product is retained for use as the emulsifier for the next reaction. Additional advantages are realized in the substantial savings in production costs realized because purification of the reaction product to remove the emulsifier is unnecessary. However, this is not always possible, and it is sometimes necessary to include emulsifying agents that are not similar to the products of the reaction.

It has also found that higher yields of sucrose ester are obtained when a transparent emulsion is formed between the ester and the aqueous sucrose solution, and such emulsion is maintained transparent during the distillation of the water. An opaque emulsion will result in lower yields of the ester product.

The factors effecting the transparency of a transparent emulsion reaction system utilized in preparing sucrose esters are also the nature and concentration of the emulsifying agent, as well as the temperature at which the water is distilled off. To form a transparent emulsion, the hydrocarbon chain of at least one of the emulsifying agents used should be at least as long as the hydrocarbon chain of the fatty acid ester reactant. This condition is automatically fulfilled when a portion of the reaction product is used as the emulsifying agent in a subsequent reaction mixture. The concentration of the emulsifying agent and the temperature at which a transparent emulsion is formed are as follows: Generally, concentrations of from about 10 to 40 percent based on the total weight of the reaction mass, and temperatures of from about 25° to 100° C. have found to be useful.

The following process is illustrative of a preferred mode of preparing sucrose esters according to the present invention. The appropriate fatty acid ester is combined with sucrose, sufficient water to dissolve the sucrose, and from 10 to 40 percent of an emulsifying agent which corresponds to a mixture of the reaction end product and soap. All of the above concentrations are based on the weight of the reaction mass, and the ratio of the fatty acid ester to sucrose depends upon the particular reaction end product and is generally from 1:3 to 3:1 equivalents.

The above composition is heated to approximately 95° C. to dissolve the sugar, and the temperature is then adjusted to obtain an emulsion with the greatest transparency; distilling off the water at such adjusted temperature by employing a vacuum. The adjusted temperature may be raised during the last stages of distillation to insure the complete removal of the water.

At this point of the reaction little, if any, sucrose ester will have formed. An alkaline catalyst is added, such as, potassium carbonate, and the reaction mass is heated at a temperature of from about 60° to 200° C. to effect conversion to the sucrose ester. The reaction rate increases with an increase in temperature. The preferred reaction temperature is from about 90° to 160° C. In those instances in which the ester reactant is an ester of a volatile alcohol, a vacuum is applied during the heating to remove the alcohol produced along with the sucrose ester. Approximately 0.5 to 1 percent of the alkaline catalyst in excess of any free fatty acids present has been found satisfactory.

This added embodiment of preparing sucrose esters has as its primary objective the formation of solid, sufficiently small particles of sucrose as the water is removed. The small particle size is necessary for the subsequent transesterification reaction. Therefore, the formation of a transparent emulsion followed by the distillation of the water results in sucrose particles having a diameter of under one micron. However, it has also been discovered that the initial formation of a transparent emulsion can be avoided. In essence, the discovery resides in combining the sucrose, water and emulsifying agent in the absence of the fatty acid ester. The solution is heated and the water is distilled off. It is believed that the mechanism of the reaction involves the interference of the sucrose crystal growth by the emulsifying agent. The resulting sucrose particles, together with the emulsifying agent, are dispersed in the ester reactant and the catalyst is then added. The reaction mass is heated and results in a sucrose ester.

In determining the conditions that are required for the formation of a transparent emulsion, prior art knowledge is employed. Thus, according to theory it is necessary to employ an emulsifier system that gives a condensed interphase between the fatty ester and the aqueous phase. If this condensed interphase is a liquid interphase, the lamellar micelles that are formed by the emulsifier are unable to imbibe the fatty ester phase or the aqueous phase and swell almost without limit. This is the condition required for the formation of a micro emulsion. If the condensed interphase is not a liquid interphase, but is more highly condensed, a micro emulsion will not form.

One may arrive at the conditions that are required for a micro emulsion in various ways. One common procedure is to employ a combination of an anionic surfactant with a water-insoluble long hydrocarbon chain polar compound, such as a fatty alcohol or a sterol. This combination is known to give a condensed interphase, but one that is too highly condensed at room temperature to form a transparent emulsion. However, the interphase can be expanded to a liquid interphase by the addition of a medium-chain alcohol, one with 5 to 8 carbon atoms in the chain. Raising the temperature can have the same effect as adding a medium-chain alcohol.

In the preparation of sucrose esters it is advantageous to employ the sucrose ester reaction product as the major emulsifier. Sucrose esters are known to form condensed interphases in combination with anionic surfactants. (See "Effect of Water-Soluble and Water-Insoluble Long Chain Polar Additives on Micellar Solutions of Sodium Dodecylbenzene Sulfonate," Osipow, L.I., and Snell, F. D., J. American Oil Chemists' Society 38, 595–7, November 1961.) Thus, the combination of sucrose ester and an anionic surfactant can be employed as the basic emulsifier system. They are combined with the fatty ester reactant and a concentrated solution of sucrose in water. Portions of the composition are maintained at various temperatuers to determine the temperature at which a transparent emulsion is formed which does not layer on standing. That temperature is the temperature at which the water should be distilled. If a micro emulsion does not form, other concentrations and ratios of the emulsifiers must be explored.

The following examples are provided for illustrative purposes and may include particular features of the invention. However, the examples should not be construed as limiting the invention, many variations of which are possible without departing from the spirit or scope thereof.

EXAMPLE I

Preparation of sulfonate

This example demonstrates another method of forming a micro emulsion. An anionic surfactant is the only emulsifying agent employed and the presence of an electrolyte represses the ionization of the anionic surfactant resulting in a condensed interphase. The system is titrated to transparency with a medium chain alcohol, which in this instance is 2-ethyl-1,3 hexanediol.

An alpha-olefin is converted to the sulfonate using the micro emulsion procedure. The following materials are placed in a 3-neck flask fitted for heating, stirring, and vacuum distillation:

| | G. |
|---|---|
| Hexadecene-1 | 43.6 |
| Sodium octadecyl sulfonate | 60.0 |
| 2-ethyl-1,3 hexanediol | 48.0 |
| Sodium bisulfite | 21.0 |
| Tert.-butyl perbenzoate | 1.0 |
| Water, 160.0 ml. | |

The reaction mixture forms a transparent emulsion when heated to 70–95° C. It is maintained at 90–95° C. for four hours, while stirring. The emulsion remains transparent throughout.

Some water and volatile organic components are removed by distillation at 100° C. The pressure in the reaction flask is gradually lowered to 5 mm. Hg while maintaining a temperature of 90–95° C. during the distillation to remove the remainder of the water. Analyses of the residual products shows that 76.5% of the hexadecene had reacted to form sodium hexadecyl sulfonate.

EXAMPLE II

Preparation of dihydroxystearic acid

Oleic acid is oxidized to dihydroxystearic acid with potassium permanganate using the micro emulsion procedure. A micro emulsion is formed by combining the following in a beaker:

| | G. |
|---|---|
| Oleic acid | 25 |
| Lanolin alcohol, 40 mole ethylene oxide adduct | 50 |
| Water, 5 ml. | |

With the micro emulsion at 65° C., 24 g. of potassium permanganate dissolved in 100 ml. of water at 70° C. is added slowly over a four hour period while stirring vigorously. Oxidation proceeds quickly with the formation of insoluble manganese dioxide.

One liter of ethanol is then added to the mixture, and the manganese dioxide separated by filtration. The filtrate is adjusted to pH 5 with dilute sulfuric acid and evaporated to a volume of 150–200 ml. An upper semi-solid layer is separated from the concentrate, and recrystallized three times from ethyl acetate. A total of 14.6 g. of dihydroxystearic acid melting at 88–91° C. is recovered.

EXAMPLE III

Preparation of acetal

An acetal of lauryl alcohol and dextrose is prepared using the micro emulsion procedure. A 2:1 molar ratio of lauryl alcohol to dextrose is employed, with the reaction mixture consisting of the following:

|  | G. |
|---|---|
| Lauryl alcohol | 64.4 |
| Dextrose | 36.0 |
| Water, 30.0 ml. | |
| Lanolin alcohol, 40 mole ethylene oxide adduct | 60.0 |
| Dodecylbenzene sulfonic acid | 6.0 |

After dissolving the sulfonic acid catalyst in a portion of the ethoxylated lanolin alcohol, the materials are combined in a 3-neck flask fitted for heating, stirring, and vacuum distillation. The mixture is heated initially to 95–100° C. to dissolve the components and form a transparent emulsion. The system is then cooled to 70–75° C. and vacuum is applied to distill off the water. The emulsion remains clear throughout the distillation. When it appears that all of the water has been removed, the temperature is increased to 100° C., and the vacuum is adjusted to 4 mm. Hg pressure and maintained under these conditions for four hours. The composition is agitated vigorously throughout the reaction period.

Analysis shows that 41.3% of the dextrose had reacted to form the acetal.

EXAMPLE IV

Preparation of sucrose ester

This example illustrates the preparation of a mixed sucrose ester of stearic and palmitic acids. Sucrose monostearate is employed as the emulsifying agent in combination with a much smaller amount of sodium stearate. It had previously been established that this combination resulted in a transparent emulsion.

Approximately equal molar quantities of sucrose and an equal weight mixture of methyl stearate and methyl palmitate are employed in the following reaction mixture:

|  | G. |
|---|---|
| Sucrose | 80.4 |
| Water, 166.8 ml. | |
| Sucrose monostearate | 40.5 |
| Sodium stearate | 12.3 |
| Methyl stearate, methyl palmitate (50:50) | 75.0 |

The materials are combined in a three-neck flask fitted for heating, stirring, and vacuum distillation. The mixture is heated with stirring to 85° C. to dissolve the sugar and form the emulsion. While maintaining the emulsion at 80–85° C., vacuum is applied and the water is removed by distillation. The last portion of the water is removed at 90° C., 4 mm. Hg pressure.

The emulsion initially shows some haze or opalescence in the flask, but increases in clarity after about 50 ml. of water has been distilled. As additional water is removed, the viscosity increases to a gel-like consistency.

Following the complete removal of water, 0.75 g. of anhydrous potassium carbonate is added and the mass is stirred for 4½ hours, while at 90° C., 3 mm. Hg. pressure.

A portion of the composition is removed and the reaction mass is reheated under vacuum, with stirring. Additional portions are removed after 45 minutes at 150° C., and then after further heating at 158° C. for 90 minutes.

The three portions are analyzed by thin layer chromatography. The results show that after 4½ hours at 90° C., about 25% of the methyl ester has been converted to sucrose diester and higher esters of sucrose. After an additional 45 minutes at 150° C., practically all of the methyl ester has been converted to sucrose esters. The reaction mass contains approximately equal quantities of sucrose monoester and higher esters of sucrose.

Additional heating at 158° C. does not produce any further change in the composition of the reaction mixture.

EXAMPLE V

Preparation of sucrose ester

This example also illustrates the preparation of a mixed sucrose ester of stearic and palmitic acids. It differs from Example IV in that an emulsion is not formed at any stage in the preparation of the sucrose esters. The same quantities of all components were used as in Example IV. The following components are combined initially:

|  | G. |
|---|---|
| Sucrose | 80.4 |
| Water, 166.8 ml. | |
| Sucrose monostearate | 40.5 |
| Sodium stearate | 12.3 |

The methyl esters are not introduced at this point. The sucrose and emulsifiers are dissolved in the water in a three-neck flask fitted for heating, stirring and vacuum distillation. The water is then removed by distillation, as in Example IV.

The appearance of the mass is quite similar to that of Example IV. The solution is initially somewhat opalescent, but clarifies after about 50 ml. of water is distilled. Frothing is greater than in the previous example, and a few drops of silicone antifoam are added. Stirring is also more difficult as the last portion of the water is removed.

After all of the water has been removed by vacuum distillation, 75.0 g. of an equal weight mixture of methyl stearate and methyl palmitate and 0.75 g. of anhydrous potassium carbonate are blended with the dry mixture of sucrose and emulsifiers. The mass is then heated with stirring, under exactly the same conditions as in Example IV (following the addition of potassium carbonate).

Analysis by thin layer chromatography gives essentially the same results as were obtained in Example IV. Heating for 45 minutes at 150° C. results in practically complete conversion of the methyl esters to mixed sucrose esters.

Although the invention has been described and illustrated by reference to particular embodiments thereof, it will be understood that in its broadest aspects the invention is not so limited to such embodiments and that variation and substitution of such equivalents may be resorted to within the scope of the appended claims.

What is claimed is:

1. A process for preparing sucrose esters of fatty acids by a transesterification reaction between sucrose and an ester of a 12 to 22 carbon atom fatty acid, which comprises dissolving sucrose in water to form an aqueous solution of sucrose, combining said aqueous solution of sucrose with the ester of the 12 to 22 carbon atom fatty acid in the presence of a suitable emulsifying agent to form a transparent emulsion, removing substantially all the water from the emulsion and heating the resulting composition under alkaline conditions at a reaction temperature in the range of 60° to 200° C. to effect conversion of sucrose to a sucrose ester of a fatty acid having 12 to 22 carbon atoms.

2. A process according to claim 1 wherein the reaction temperature is in the range of 90° to 160° C.

3. A process according to claim 1 wherein the emulsifying agent employed is the same as the sucrose ester formed by the reaction process.

4. A process according to claim 1 wherein subsequent to the removal of the water and prior to the reaction of the sucrose and the ester of the fatty acid having from 12 to 22 carbon atoms, the reaction mass is subjected to a vacuum.

5. A process according to claim 1 including the step of recovering the sucrose ester.

References Cited

UNITED STATES PATENTS 2,948,716   8/1960   Davis   260—234
2,948,717   8/1960   Babayan   260—234
3,021,324   2/1962   Knafo et al.   260—234
3,480,616   11/1969   Osipow et al.   260—234

LEWIS GOTTS, Primary Examiner

J. R. BROWN, Assistant Examiner

U.S. Cl. X.R.

260—209 R, 413, 513 R